United States Patent [19]
Yang et al.

[11] Patent Number: 5,801,641
[45] Date of Patent: Sep. 1, 1998

[54] CONTROLLER FOR A NON-BLOCKING BROADCAST NETWORK

[75] Inventors: Yuanyuan Yang; Gerald M. Masson, both of Baltimore, Md.

[73] Assignee: The Johns Hopkins University, Baltimore, Md.

[21] Appl. No.: 529,582

[22] Filed: Sep. 18, 1995

Related U.S. Application Data

[63] Continuation of Ser. No. 138,893, Oct. 19, 1993, Pat. No. 5,451,936.

[51] Int. Cl.⁶ .................................................. H04Q 9/00
[52] U.S. Cl. .................... 340/826; 340/825.03; 370/388; 370/357; 370/371; 370/381; 379/220; 379/271
[58] Field of Search ........................... 340/826, 827, 340/825.8, 825.03, 825.79; 370/388, 442, 357, 371, 381; 379/220, 271, 335

[56] References Cited

U.S. PATENT DOCUMENTS

| | | | |
|---|---|---|---|
| 4,245,214 | 1/1981 | Beirne | 340/825.79 |
| 4,394,541 | 7/1983 | Seiden | 340/827 |
| 4,417,244 | 11/1983 | Melas | 340/825.8 X |
| 4,417,245 | 11/1983 | Melas et al. | 340/827 |
| 4,771,419 | 9/1988 | Graves et al. | 370/60 X |
| 4,914,429 | 4/1990 | Upp | 340/825.8 |
| 5,450,074 | 9/1995 | Yoshifuji | 340/825.8 |

FOREIGN PATENT DOCUMENTS

| | | | |
|---|---|---|---|
| 5-336555 (A) | 12/1993 | Japan | 340/827 |

*Primary Examiner*—Brian Zimmerman
*Assistant Examiner*—William H. Wilson, Jr.

*Attorney, Agent, or Firm*—Arnold B. Silverman; Eckert Seamans Cherin & Mellott, LLC

[57] ABSTRACT

A controller for a nonblocking broadcast switching network comprising an input stage, an output stage, and a middle stage. The input stage has $N_1$ or $n_1 r_1$ input ports and $r_1$ switches, where $n_1 \geq 2$ and $r_1 \geq 1$ and are integers. The network also includes an output stage. The output stage has $N_2$ or $n_2 r_2$ output ports and $r_2$ switches, where $n_2 \geq 2$ and $r_1 \geq 1$ and are integers. There is also a middle stage. The middle stage has m switches, where $$m > \min_{1 \leq x \leq \min\{n_2-1, r_2\}} \{(n_1-1)x + (n_2-1)r_2^{1/x}\}.$$

The m switches are in communication with the $r_1$ switches and $r_2$ switches. The middle stage of m switches has L inputs, where $L \geq r_1$ and is an integer, and J outputs, where $J \geq r_2$ and is an integer, corresponding to the $n_1$ input ports and $n_2$ output ports, x or fewer of the m switches, where $1 \leq x \leq m$, always available to form a connection between an idle input port and a plurality of idle output ports, but no output port is connected to more than 1 input port. In a preferred embodiment, the controller includes a mechanism for determining which middle stage switches are idle at a given time in the network. The controller also includes a mechanism for choosing middle stage switches from only the idle middle stage switches to form a desired broadcast connection between an idle input port and a plurality of idle output ports. Preferably, the mechanism for choosing chooses the minimum number of idle middle stage switches to form the desired broadcast connection.

13 Claims, 15 Drawing Sheets

X, Y, Z: log r bits
AX, AY, AZ: log m bits $AZ_i = AX_i(X<Y) + AX_i(X=Y) + AY_i(X>Y)$
$Z_i = X_i(X<Y) + X_i(X=Y) + Y_i(X>Y)$

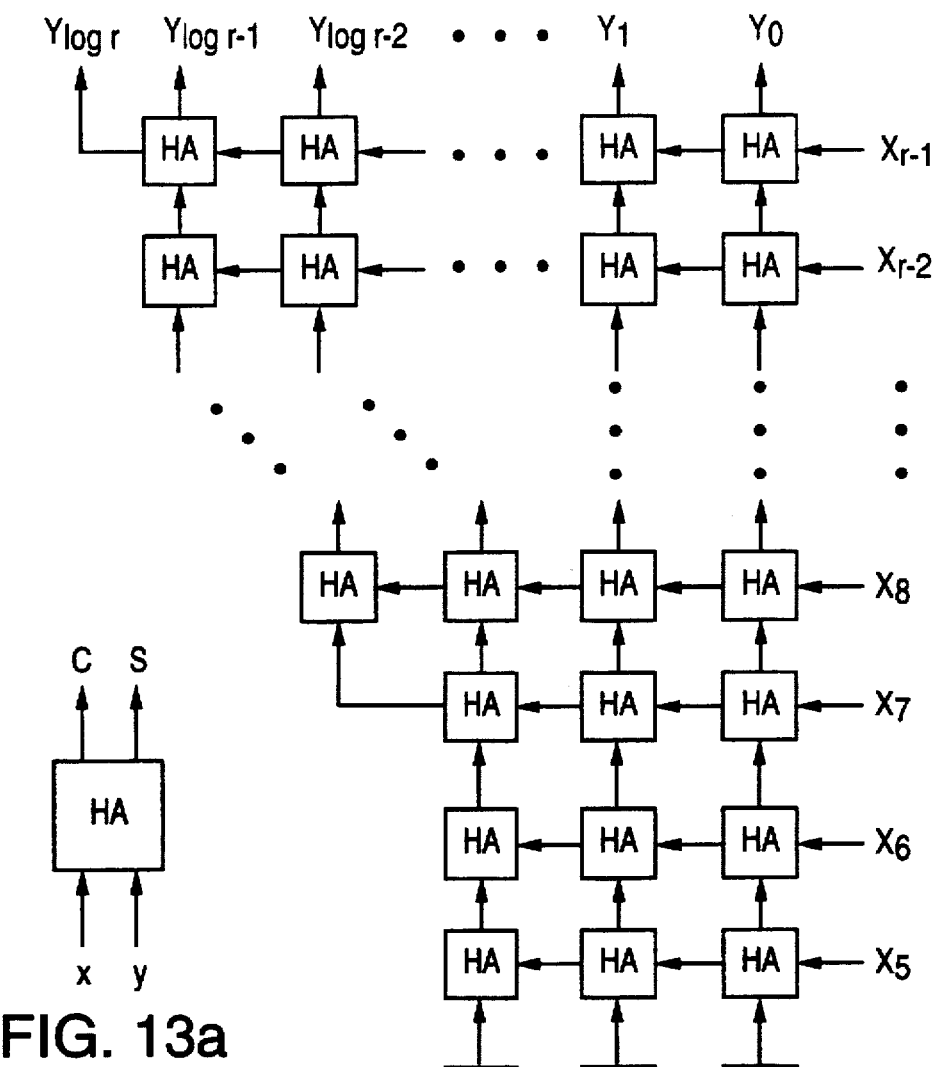
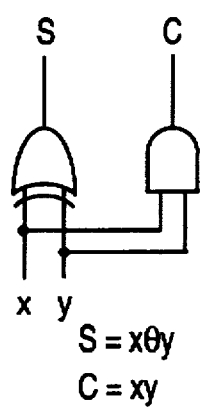
FIG. 13a
FIG. 13b  $S = x \oplus y$  $C = xy$
FIG. 13c

CONTROLLER FOR A NON-BLOCKING BROADCAST NETWORK

This is a continuation of copending application Ser. No. 08/138,893 filed on Oct. 6, 1993,now U.S. Pat. No. 5,451,936.

LICENSES

This invention was made with Government support under a grant from the Air Force Office of Scientific Research. The Government has certain rights in this invention.

FIELD OF THE INVENTION

The present invention pertains to a nonblocking broadcast network. More specifically, the present invention pertains to a nonblocking broadcast switching network having m middle stage switches where x or fewer of the m middle switches are always available to form a connection between an idle input port and a plurality of idle output ports.

BACKGROUND OF THE INVENTION

One of the most well-known nonblocking multi-stage switching network designs is due to Clos (C. Clos, "A study of nonblocking switching networks," *The Bell System Technical Journal*, vol. 41, pp. 1201–1247, 1962). The so-called Clos network provides strictly nonblocking connecting capability for permutation assignments between input ports and output ports in which each input port can be connected to at most one output port in a one-to-one fashion. For a v(m,n,r) network, Clos showed that if $m \geq 2n-1$, the network was strictly nonblocking; and for a $v(m,n_1,r_1,n_2,r_2)$ network, if $m \geq n_1+n_2-1$, the network was again strictly nonblocking. The Clos network structure demonstrated that strictly nonblocking multi-stage switching networks could be designed at a considerable savings in switching costs as compared with the obvious alternative of using a large single-stage switch with a crosspoint switching element between each input port and output port. Cantor (D. Cantor, "On nonblocking switching networks," *Networks*, vol. 2,pp. 367–377, 1972) later improved upon the Clos design with an alternative multi-stage structure that could provide strictly nonblocking connecting capability for permutation assignments with asymptotically fewer crosspoints.

It is not surprising that nonblocking networks designed for permutation assignments are not in general nonblocking for broadcast assignments, and, indeed, do not even necessarily satisfy all broadcast assignments (G. M. Masson, "Upper bounds on fanout in connection networks," *IEEE Trans. Circuits and Systems (Special Issue on Large-Scale Systems)*, vol. CT-20, pp. 222–230, 1973). Masson (G. M. Masson and B. W. Jordan, "Realization of a class of multiple connection assignments with multi-stage connection networks," *Proceedings of the Fifth Annual Princeton Conference on Information Sciences and Systems*, pp. 316–321, 1971; G. M. Masson and B. W. Jordan, "Generalized multi-stage connection networks," *Networks*, vol. 2, pp. 191–209, 1972) first gave designs for strictly nonblocking and rearrangeable multi-stage switching networks for broadcast assignments. For the case of a three-stage v(m,n,r) network, it was shown for broadcast assignments that if $m \geq n(r+1)-1$, the network was strictly nonblocking, and if $m \geq nr$, the network was rearrangeable. Hwang (F. K. Hwang, "Rearrangeability of multiconnection three-stage networks," *Networks*, vol. 2, pp. 301–306, 1972) later pointed out that if, for some reason, the middle stage switch modules did not have broadcast capability so that all connection path fanout must take place in the input and output stage switch modules, then Masson's condition on the number of middle stage switch modules for rearrangeable connection capability was necessary and sufficient.

Hwang and Jajszczyk (F. K. Hwang, "Three-stage multi-connection networks which are nonblocking in the wide sense," *Bell System Technical Journal*, vol. 58, pp. 1283–1287, 1979; A. Jajszczyk, "Comments on: Three-stage multi-connection networks which are nonblocking in the wide sense," *Bell System Technical Journal*, vol. 62, pp. 2113–2114, 1983; F. K. Hwang and A. Jajszczyk, "On nonblocking multiconnection networks," *IEEE Trans. Communications*, vol. COM-34, pp. 1038–1041, 1986) have given a set of design conditions for nonblocking multi-stage multi-connection switching networks. A multi-connection is a generalization of a broadcast connection in the sense that input sets are connected to output sets.

Masson (G. M. Masson, "Binomial switching networks for concentration and distribution," *IEEE Trans. Communications*, vol. Com-25, pp. 873–884, 1977) has also shown a two-stage design of a rearrangeable broadcast switching network which cascades sparse crossbar switching structures that function as concentrators (G. M. Masson, "Lower Bounds on crosspoints in concentrators," *IEEE Trans. Computers*, vol. C-31, pp. 1173–1179, 1982) with broadcast switching modules. Later, Kufta and Vacroux (R. W. Kudta and A. G. Vacroux, "Multiple stage networks with fanout capabilities," *Proceedings Computer Networking Symp.*, Silver Spring, MD, pp. 89–96, 1983) and then Richards and Hwang (G. W. Richards and F. K. Hwang, "A two-stage rearrangeable broadcast switching network," *IEEE Trans. Communications*, vol. COM-33, pp. 1025–1034, 1985; G. W. Richards and F. K. Hwang, "A two-stage rearrangeable broadcast switching network," *Proceedings of the* 11th *International Teletraffic Congress*, pp. 1083–1087, Kyoto, Japan, September 1985) used Masson's two-stage concept as the basis of re-configured and extended—but nevertheless fundamentally similar—rearrangeable broadcast network designs. It should be mentioned that although the reconfigured form of Masson's initial two-stage design concept was patented by Richards (G. W. Richards, "Rearrangeable multiconnection switching networks," U.S. Pat. No. 4,566,007 Jan. 21, 1986), the fundamental design concept had been previously known (G. M. Masson, Report on fan-out switching networks, presented to P. Fire and H. Graves, GTE Sylvania, and T. Dixon, Department of Defense, Mountain View, Calif., 1973).

Other techniques of cascading networks of various types to achieve broadcasting capability have been considered. Lea (Chin-Tau Lea, "A new broadcast switching network," *IEEE Trans. Communications*, vol. COM-36, pp. 1128–1137, 1988) has studied cascading a spreading (or fanout) multi-stage network with a permutation network for the design of rearrangeable broadcast networks. Turner (J. S. Turner, "Practical wide-sense nonblocking generalized connectors," *Washington University Computer Science Research Report* –88–29, 1988) has considered the cascading of Cantor and Clos networks to achieve nonblocking broadcast connection capability. Finally, Kumar (M. Kumar, "Supporting broadcast connections in Benes networks" *IBM Research Report* RC-14063, 1988) has studied a five-stage construction based on the overlapping of two three-stage networks as a rearrangeable broadcast network design.

Dolev, Dwork, Pippenger, and Wigderson (D. Dolev, C. Dwork, N. Pippenger, and A. Wedgerson, "Superconcentrators, generalizers and generalized connectors with limited depth," *Proc. of the 15th Annual ACM*

Symposium on Theory of Computing, pp. 42–51, 1983) have given minimum possible upper bounds on the number of crosspoints required for k-stage rearrangeable broadcast networks. Subsequently, Feldman, Friedman, and Pippenger (P. Feldman, J. Friedman, and N. Pippenger, "Wide-sense nonblocking networks," *SIAM Journal of Discrete Mathematics*, vol. 1, No. 2, pp. 158–173, May 1988) showed improved upper bounds for k-stage nonblocking broadcast networks. But neither explicit constructions nor efficient control algorithms for networks satisfying these bounds are known. However, Dolev, Dwork, Pippenger, and Wigderson (D. Dolev, C. Dwork, N. Pippenger, and A. Wedgerson, "Superconcentrators, generalizers and generalized connectors with limited depth," *Proc. of the 15th Annual ACM Symposium on Theory of Computing*, pp. 42–51, 1983) did offer a construction for a (3k–2) stage rearrangeable broadcast network (where $k \geq 1$) and Feldman, Friedman, and Pippenger (P. Feldman, J. Friedman, and N. Pippenger, "Wide-sense nonblocking networks," *SIAM Journal of Discrete Mathematics*, vol. 1, No. 2, pp. 158–173, May 1988) gave constructions for two-stage and three-stage nonblocking broadcast networks. Finally, by means of an application of a hypergraph-hypercolouring theorem, Kirkpatrick, Klawe, and Pippenger (D. G. Kirkpatrick, M. Klawe and N. Pippenger, "Some graph-colouring theorems with applications to generalized connection networks," *SIAM Journal of Alg. Disc, Math.*, vol. 6, No. 4, pp. 576–582, October 1985) gave constructive designs for multi-stage rearrangeable broadcast networks.

The present invention is concerned with the design of broadcast networks to provide so-called nonblocking connecting capability in multi-stage switching networks. In these nonblocking broadcast networks, any broadcast connection request from a network input port to a set of network output ports can be realized without any disturbance (that is, rearrangement) of other existing broadcast connections with the restriction that at no time is any output port connected to more than one input port. Additionally, a network output port that is connected to a network input port in some broadcast connection, can upon disconnection from that network input port be included in future broadcast connection requests made by network input ports. The present invention also involves a linear algorithm for satisfying new broadcast connection requests in the network. These nonblocking broadcast network designs are an improvement in terms of required switching elements and network control complexity over other previously known designs, even including some rearrangeable broadcast network designs.

SUMMARY OF THE INVENTION

The present invention pertains to a nonblocking broadcast switching network. The network comprises an input stage. The input stage has $N_1$ or $n_1 r_1$ input ports and $r_1$ switches, where $n_1 \geq 2$ and $r_1 \geq 1$ and are integers. The network is also comprised of an output stage. The output stage has $N_2$ or $n_2 r_2$ output ports and $r_2$ switches, where $n_2 \geq 2$ and $r_1 \geq 1$ and are integers. There is also a middle stage. The middle stage has m switches, where $$m > \min_{1 \leq x \leq \min\{n_2-1, r_2\}} \{(n_1-1)x + (n_2-1)r_2^{1/x}\}.$$

The m switches are in communication with the $r_1$ switches and $r_2$ switches. The middle stage of m switches has L inputs, where $L \geq r_1$ and is an integer, and J outputs, where $J \geq r_2$ and is an integer, corresponding to the $n_1$ input ports and $n_2$ output ports, x or fewer of the m switches, where $1 \geq x \geq m$, always available to form a connection between an idle input port and a plurality of idle output ports, but no output port is connected to more than 1 input port.

In a preferred embodiment, the controller is comprised of means for determining which middle stage switches are idle at a given time in the network. The controller is also comprised of means for choosing middle stage switches from only the idle middle stage switches to form a desired broadcast connection between an idle input port and a plurality of idle output ports. Preferably, the choosing means chooses the minimum number of idle middle stage switches to form the desired broadcast connection.

BRIEF DESCRIPTION OF THE DRAWINGS

In the accompanying drawings, the preferred embodiment of the invention and preferred methods of practicing the invention are illustrated in which:

FIGS. 13a, 13b and 13c are block diagrams of a half-adder, a circuit of a half-adder and a half-adder array, respectively.

DESCRIPTION OF THE PREFERRED EMBODIMENT

Figure 3:
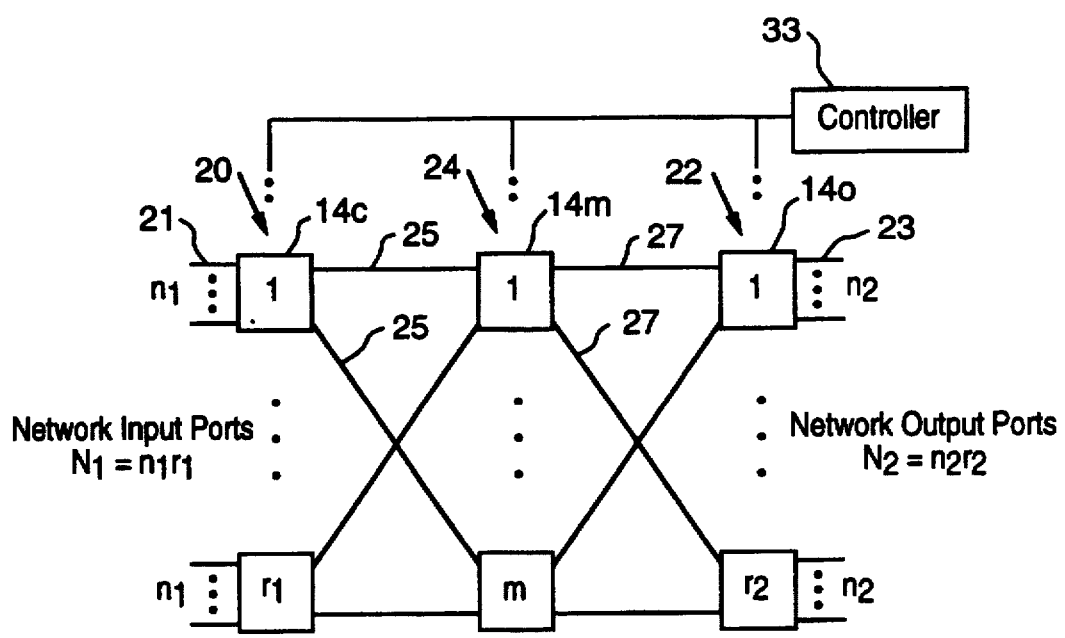
FIG. 3 is a block diagram of an $N_1 \times N_2$ three-stage switching network.
Figure 2A:
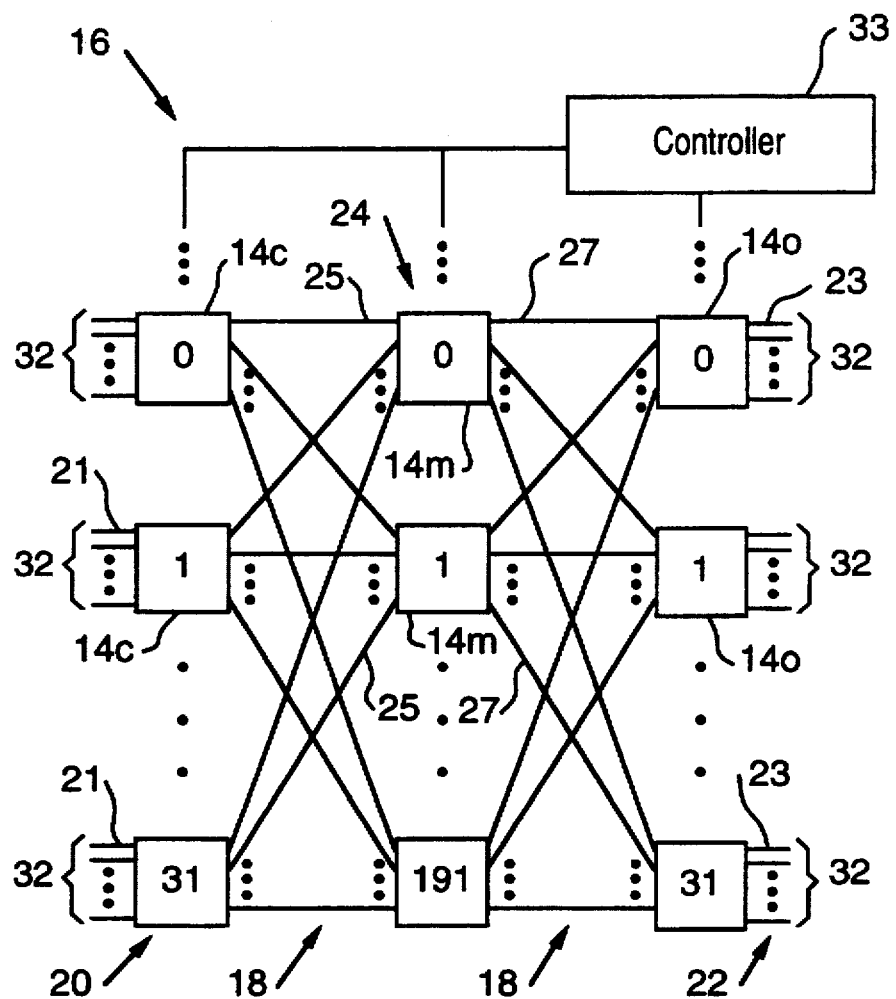
FIG. 2a is a block diagram of a nonblocking broadcast switching network.

Referring now to the drawings wherein like reference numerals refer to similar or identical parts throughout the several views, and more specifically to FIGS. 2 and 3 thereof, there is shown a nonblocking broadcast switching network 16 comprising an input stage 20. The input stage 20 has $N_1$ or $n_1 r_1$ input ports 21 and $r_1$ switches 14i, where $n_1 \geq 2$ and $r_1 \geq 1$ and are integers. The network is also comprised of an output stage 22. The output stage 22 has $N_2$ or $n_2 r_2$ output ports 23 and $r_2$ switches 14o, where $n_2 \geq 2$ and $r_1 \geq 1$ and are integers. The network 16 is also comprised of a middle stage 24. The middle stage has m switches 14m, where $$m > \min_{1 \leq x \leq \min\{n_2-1, r_2\}} \{(n_1-1)x + (n_2-1)r_2^{1/x}\},$$

in communication with the $r_1$ switches 14i and $r_2$ switches 14o. The middle stage 24 of m switches 14m has L inputs 25, where $L = \geq r_1$ and is an integer, and J outputs 27, where $J \geq r_2$ and is an integer, corresponding to the $n_1$ input ports 21 and $n_2$ output ports 23. X or fewer of the m switches 14m, where $1 \leq x \leq m$ are always available to form a connection between an idle input port 21 and a plurality of idle output ports 23, but no output port is connected to more than one input port 21.

For example:

Given $N_1 = N_2 = N = n_1 r_1 = 1024$, $n_1 = n_2 = n$ and $r_1 = r_2 = r$, to design a three-stage nonblocking broadcast network, do the following:

1. Choose n and r (for example, choose n=r around $\sqrt{N}$):

n=r=32

2. Find x to minimize $(x + r^{1/x})$:

x=3

3. Find m such that $\lfloor (n-1)(x + r^{1/x}) \rfloor$:

m=192

This network structure represents an improvement on the minimum number of switches in the middle stage to $O(n \log r / \log \log r)$ relative to previously known results.

In an alternative embodiment, each broadcast connection in the network is between an idle input port and at most d idle output switches, where $1 \leq d \leq r_2$, and $$m > \min_{1 \leq x \leq \min\{n_2-1, d\}} \{(n_1-1)x + (n_2-1)d^{1/x}\},$$

The network 16 preferably includes a controller 33 in communication with the input, output and middle stages to form connections between an idle input port 21 and a plurality of idle output ports 23. The controller 33 preferably includes means for forming the connections by choosing idle middle switches 14m which connect with the most idle output ports in which a broadcast assignment is to be formed, to create the broadcast assignment.

Figure 4:
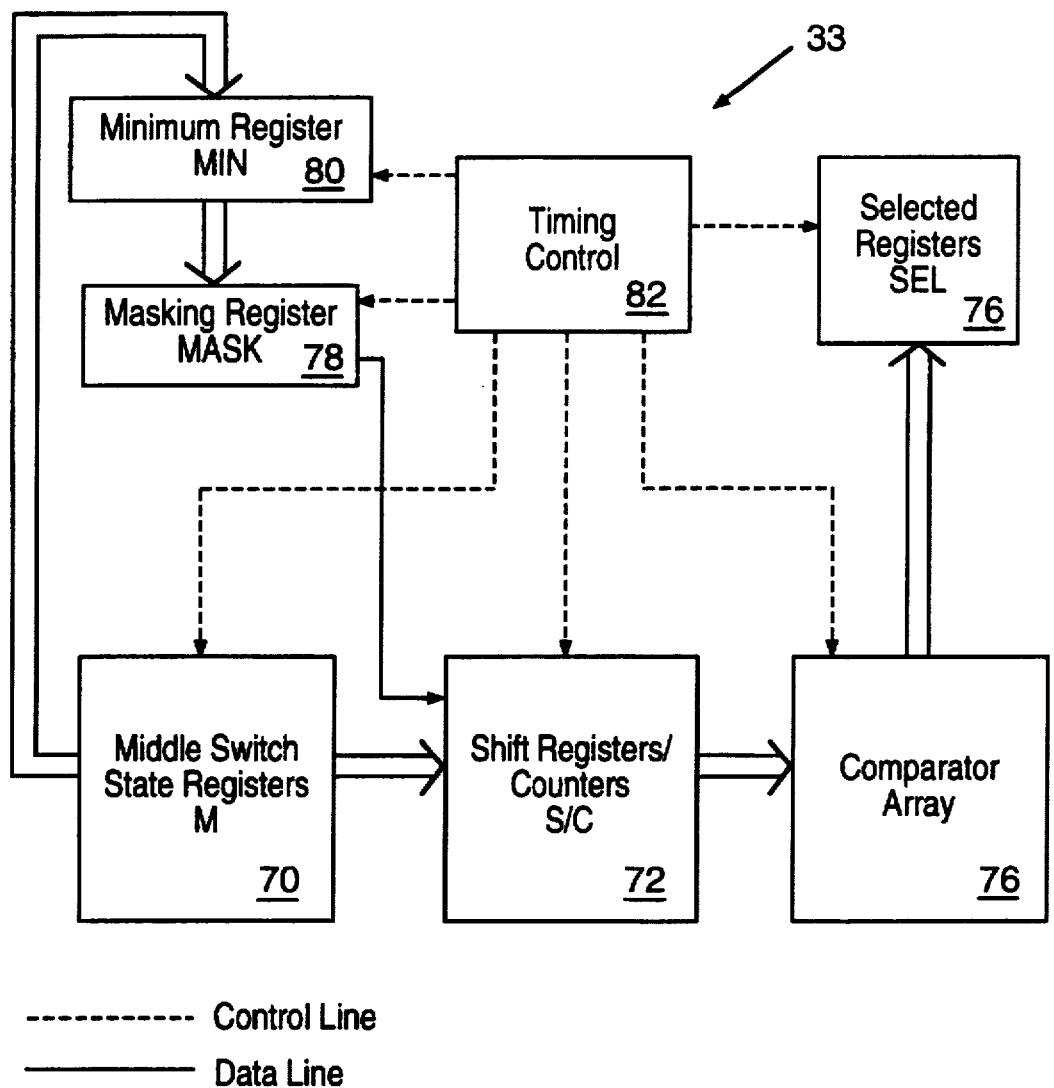
FIG. 4 is a block diagram of a controller.

Preferably, as shown in FIG. 4, the controller 33 is comprised of means for determining which middle stage switches 14m output links 27 are idle at a given time in the network. The determining means preferably includes middle stage switch registers 70 which store information about which middle stage switches 14m output links 27 are idle.

Additionally, the controller 33 is comprised of means for choosing middle stage switches 14m from only the idle middle stage switches 14m which have an idle input link 25 to the input switch 14i where the broadcast connection request arises and idle output links 27 to the output switches in the broadcast connection to form a desired broadcast connection between an idle input port 21 and a plurality of idle output ports 23. Preferably, the choosing means chooses the minimum number of idle middle stage switches 14m to form the desired broadcast connection. There are always idle middle stage switches 14m in the network 16 to form the desired broadcast connection.

The choosing means preferably includes means for picking the idle middle stage switches 14m which form the desired broadcast connections based on those middle stage switches 14m having the most idle connections with desired output switches 14o. The picking means preferably includes shift registers/counters 72 which identify for each considered middle stage switch 14m the number of desired output switches 14o with which it connects. The shift register/counter 72 is connected to the middle switch state registers 70. The picking means preferably also includes a comparator array 74 connected to the shift register/counter 72 which compares the number of desired output switches 14o to which the considered middle stage switches 14m connect. The picking means additionally preferably includes selected registers 76 connected to the comparator array 74 which select the middle stage switch 14m that connects to the most desired output switches 14o.

The choosing means can also include a masking register 78 connected to the shift registers/counters 72 which only provides information about idle middle stage switches 14m that are connected to desired output switches 14o. The choosing means can also include a minimum register 80 connected to the masking register 78 and the middle switch state register 70 for providing only information about idle middle stage switches 14m which are connected to at least a predetermined number of desired output switches 14o. There is preferably also x selected registers to store the middle switches 14m chosen to form a broadcast connection. Preferably, the choosing means has a timing control 82 connected to all the registers 70, 72, 76, 78, 80 and the array 74 for controlling a sequence of their operation.

More specifically, in an increasing number of computing and communication environments, it is necessary to simultaneously transfer text/voice/video/graphics information from a set of transmitting devices to a set of receiving devices in various combinations. Similarly, all parallel processing systems depend critically on the transfer of data among processing and memory units. This can be accomplished using an interconnection network called a multi-stage switching network. When a transmitting device simultaneously sends information to more than one receiving device, the one-to-many connection required between the transmitting device and the receiving devices is called a broadcast connection. A set of broadcast connections is referred to as a broadcast assignment. Multi-stage switching networks that can satisfy such broadcast requirements are called broadcast networks.

Figure 1A:
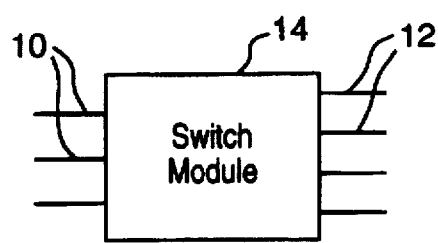
FIGS. 1a and 1b are block diagrams of a 3×4 switch module and a broadcast state of the 3×4 switch module, respectively.

Multi-stage switching networks are composed of crosspoint switching elements or, more simply, crosspoints that are usually grouped together into building-block subnetworks called switch modules. In an (N×M) multi-stage switching network with N input ports and M output ports, the switching modules 14 used as building blocks to implement the network might each have, for example, n inputs 10 and m outputs 12, where n<N and m<M. These would be referred to as (n×m) switch modules 14. An (n×m) switch module is assumed to be composed of nm crosspoints. FIG. 1(a) shows an (3×4) switch module 14.

Figure 1B:
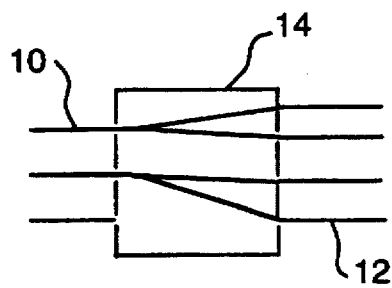

The connectivity available among the n inputs 10 and the m outputs 12 of the (n×m) switch modules 14 depends upon implementation details, but a case of general interest which will be considered exclusively in the following will be that in which the switch module 14 has sufficient crosspoint switching elements to provide broadcast capability from the n inputs 10 to the m outputs 12 in the sense that any input 10 of the switch module 14 can always be connected to any idle output 12 (that is, an output 12 from the switch module 14 that is not currently connected to any input 10 of the switch module 14). The input 10 to output 12 connections implemented in a switch module 14 characterize the state of the switch module 14. FIG. 1(b) shows a broadcast state of a (3×4) switch module 14.

Figure 2B:
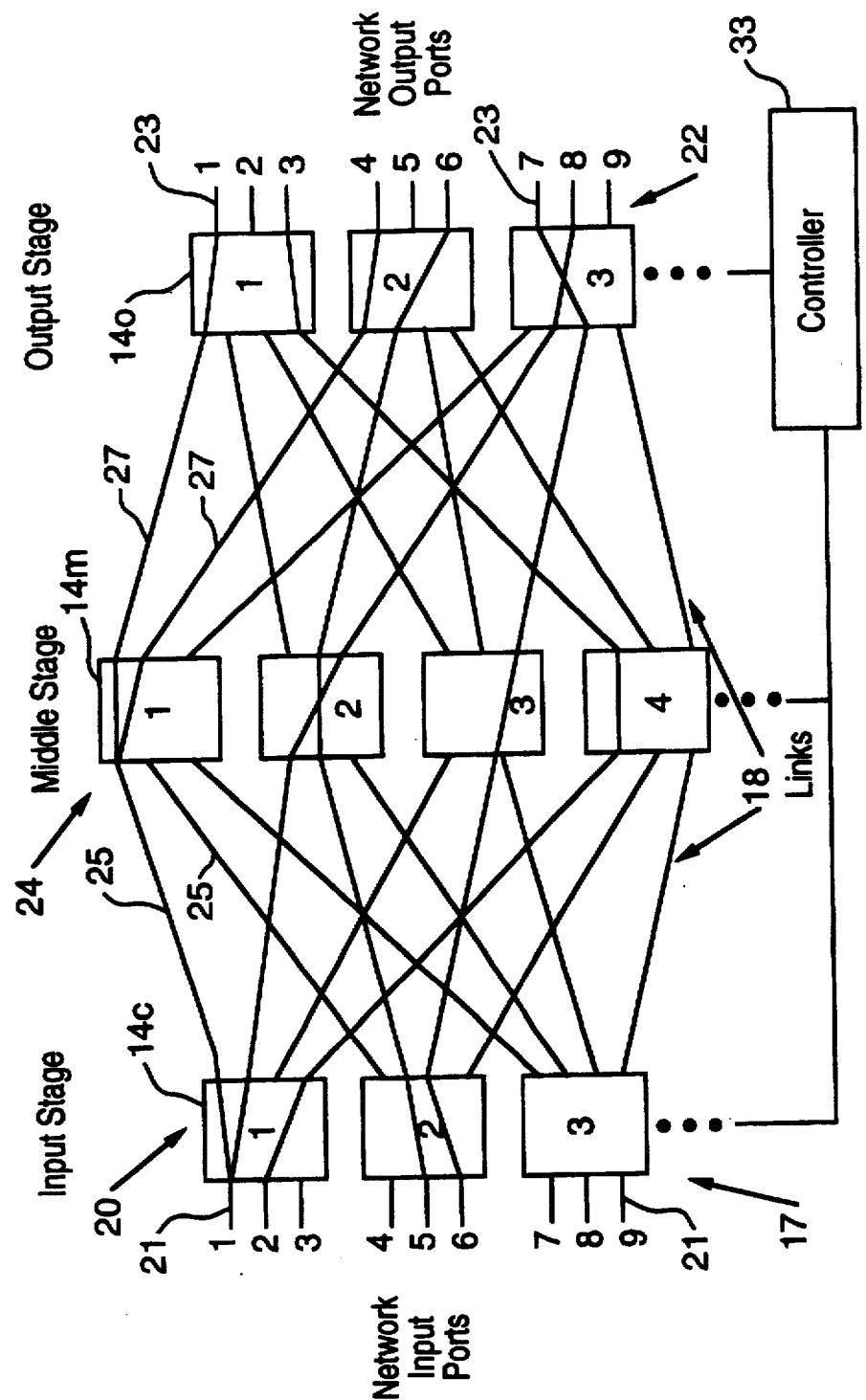
FIG. 2b is a block diagram of a 9×9 three-stage switching network.

The (n×m) switch modules 14 in a multi-stage switching network 16 are interconnected by means of links 18. The links 18 are dedicated, fixed connection paths between the inputs 10 and outputs 12 of different switch modules 14. The switch modules 14 in a multi-stage switching network 16 are grouped together into stages such that the inputs 10 of the switch modules 14 of one stage are linked only to outputs 12 of switch modules 14 of another stage, and, similarly, the outputs 12 of the switch modules 14 of one stage are linked only to inputs 10 of switch modules 14 of another stage. The inputs 10 of the switch modules 14 of the first stage of a multi-stage switching network 16 are referred to as the network input ports. This first stage is often referred to as the input stage 20 of the network 16. The outputs 12 of the last stage of a multi-stage switching network are referred to as the network output ports. This last stage is often referred to as the output stage 22 of the network 16. In a three-stage network, the second stage is referred to as the middle stage 24. The switch modules 14 in the input stage 20 are sometimes referred to as input switch modules or input switches 14i; the switch modules 14 in the output stage 22 are sometimes referred to as output switch modules or output switches 14o; and the switch modules in the middle stage are sometimes referred to as middle switch modules or middle switches 14m. FIG. 2b shows a three-stage switching network with N=M= 9 input/output ports and comprised of three (3×4) input switches 14i, four (3×3) middle switches 14m, and three (4×3) output switches 14o. The set of switch module states in a network 16 characterizes the state of the network. The network 17 of FIG. 2b is shown in a state realizing a broadcast assignment. It should be noted that FIG. 2b is not representative of a network of the present invention. It is simply shown for explanatory purposes of certain networks in general.

In general, an ($N_1 \times N_2$) three-stage network 16 has $r_1(n_1 \times m)$ switch modules 14i in stage 1, $m(r_1 \times r_2)$ switch modules 14m in stage 2, and $r_2(m \times n_2)$ switch modules 14o in stage 3. Such a multi-stage switching network 16 is denoted as a $v(m, n_1, r_1, n_2 r_2)$ network 16. A general schematic of an ($N_1 \times N_2$) three-stage network 16 is shown in FIG. 3. For the special symmetrical case where $n_1 = n_2 = n$ and $r_1 = r_2 = r$, the three-stage network is denoted as a v(m,n,r) network 17. The three-stage network 17 of FIG. 2b is a v(4,3,3) network 17. In general, the set of input ports is denoted as $\{1,2,\ldots,r_1n_1\}$ and the set of switch modules 14o in the output stage 22 are denoted as $O=\{1,2,\ldots,r_2\}$.

The results on nonblocking multi-stage broadcast switching networks that follow will initially be described primarily in terms of three-stage networks 16. It should be understood, however, that these results are applicable to k-stage networks 16 for k>3 by recursively using the design criteria developed on the switch modules 14. The presentation of the results in terms of three-stage networks is only for notational convenience. That is, these results can be generalized by recursively replacing each of a subset of switches (at least 1) in the network with a smaller three-stage network as defined by the invention which has the same number of input/output ports as the switch being replaced. For instance, in a three-stage network, one or more switches in either the input, middle or output stages can be replaced with a three-stage network to expand the network. If, for example, a five-stage network is desired, then all middle switches are replaced with a three-stage network.

The network controller of a multi-stage switching network 16 executes a network control algorithm for establishing connection paths between input and output ports. Intuitively, a large number of switch modules 14m in the middle stage(s) 24 of a multi-stage switching network 16 implies less complexity in the control algorithm for establishing connection paths between input and output ports; this follows because there will in general be many available paths from which to choose for making a requested connection. Similarly, with a small number of switching modules 14m in the middle stage(s) 24, establishing a connecting path would be expected to be more difficult and the network control algorithm correspondingly more complex. Indeed, this intuition is correct: there is an inherent trade-off between network control algorithm complexity and the number of switching modules 14 used in a design of a multi-stage switching network 16.

An awareness of this trade-off has led to the development of network structures in which providing for new connecting paths between ports can sometimes require the rearrangement of existing connection paths to alleviate a blocking condition so that a requested connection can be made. In rearrangeable networks 14, an attempt is made to reduce the switch hardware costs of the structure at the expense of the complexity and time required to set up connection paths. Multi-stage switching networks 16 which handle blocking conditions by rearrangement must be cautiously utilized. This is because of the possible disruption of on-going communication caused by the rearrangements as well as the resulting time delay in setting up the requested path. There are many applications in which the difficulties associated with rearrangements cannot be tolerated.

In general, it is desirable to minimize or, indeed, even eliminate the need for rearrangements to existing connections in order to satisfy a new connection request from an input port. Multi-stage switching network structures in which rearrangements of existing connections can be avoided in establishing a new requested broadcast connection path by an input port fall into two categories. The distinction between these two categories is due to Benes (V. E. Benes, "Heuristic remarks and mathematical problems regarding the theory of switching systems," *The Bell System Technical Journal*, vol. 41, pp. 1201–1247, 1962). In strictly nonblocking broadcast networks 16, for any legitimate broadcast connection request from an input port to some set of output ports, it is always possible to provide a connection path through the network to satisfy the request without disturbing other existing broadcast connections, and if more than one such path is available, any of them can be selected without being concerned about satisfaction of future potential broadcast connection requests. In wide-sense nonblocking broadcast networks, it is again always possible to provide a connection path through the network to satisfy the request without disturbing other existing broadcast connections, but in this case the path used to satisfy the connection request must be carefully selected so as to maintain the nonblocking connecting capability for future potential broadcast connection requests.

Without in any way attempting to criticize the term wide-sense nonblocking, as it was chosen at a time when algorithm analysis was not well developed, the term is nevertheless somewhat of a misnomer as it does not convey the notion of nonblocking connecting capability that it is meant to imply. This particular type of nonblocking capability might perhaps be better referred to as control-algorithm-dependent nonblocking capability, since the network control algorithm used to satisfy requests figures critically in the nonblocking connection capability provided. Control-algorithm-dependent nonblocking capability must be evaluated from the perspective of the complexity of the control algorithm as opposed to only a proof of its existence. It is this type of nonblocking capability that the present invention addresses, and it is referred to it as simply as nonblocking connection capability. Constructive multi-stage designs for such nonblocking broadcast networks for which a linear network control algorithm is given permits a broadcast connection request from an input port to some set of output ports to be satisfied without any rearrangement of connection paths of other existing broadcast connections. Furthermore, if any output port connected to an input port in a broadcast connection is disconnected, this output port can be included in future broadcast connection requests made by input ports.

Every switch module 14 in the networks discussed herein will be assumed to have broadcast capability. In a $v(m,n_1, r_1,n_2,r_2)$ network, if a network input port is to be connected to more than one output port on the same switch module 14o in the output stage 22 of the network 16, then it is only necessary for the input port to have one connection path to that switch module 14o. This follows because that path can be broadcast within the switch module 14o in the output stage 22 to as many output ports as necessary. Broadcast assignments can therefore be described in terms of connections between input ports and switch modules 14o in the output stage 22. An existing connection or a requested connection from an input port to output ports on r' output stage switches 14o is said to have fanout r'. It is clear that if all broadcast assignments wherein each input is to be connected to at most one output port on any switch module 14o in the output stage 22 are realizable, then broadcast assignments wherein any input port is to be connected to more than one output port on the same output stage switch module 14o can also be realized. Hence, of primarily interest are general broadcast connections with fanout r', $1 \leq r' \leq r_2$. However, also of interest are restricted broadcast connections with upper bounds on their fanout, say, d where $1 \leq d \leq r_2$.

To characterize a broadcast assignment, for each input port $i \in \{1, \ldots, r_1 n_1\}$, let $I_i \subseteq 0 = \{1, \ldots, r_2\}$ denote the subset of the switch modules 14o in the output stage 22 to which i is to be connected in the broadcast assignment. For example, for the broadcast assignment shown in FIG. 2b, $I_1 = \{1,2,3\}$, $I_2 = \{1\}$, $I_5 = \{2\}$, $I_6 = \{3\}$, and all other $I_j = \phi$.

To characterize the state of the m switch modules 14m in the middle stage 24 of a three-stage switching network 16, let $M_j \subseteq 0 = \{1, \ldots, r_2\}$, $j=1,2, \ldots, m$, denote the subset of the switch modules 14o in the output stage 22 to which the $M_j$ is providing connection paths from the input ports. In other words, each $M_j$ denotes the connection paths passing through middle switch j in terms of their output switch destinations. Set $M_j \subseteq 0 = \{1, \ldots, r_2\}$, $j=1,2, \ldots, m$, will be referred to as the destination sets of the middle switches. For example, for the broadcast assignment shown in FIG. 2b, the destination sets of the 4 middle switches 14m are $M_1 = \{1,2,\}$, $M_2 = \{2,3\}$, $M_3 = \{3\}$, and $M_4 = \{1\}$. It should be clear that in general for any state of a three-stage switching network $$\sum_{i=1}^{n_1 r_1} |I_i| = \sum_{j=1}^{m} |M_j| \leq r_2 r_2.$$

In the example of FIG. 2b, $\Sigma_i |I_i| = 3+1+1+1 = 6$, and $\Sigma_j |M_j| = 2+2+1+1 = 6$.

An O(N) algorithm for satisfying a general broadcast connection request and an O(nN) algorithm for realizing an entire broadcast assignment in the nonblocking v(m,n,r) networks of the invention is presented. Extensions of these algorithms to more general $v(m,n_1,r_1,n_2,r_2)$ networks and restricted fanout broadcast assignments can then be accomplished.

Given a v(m,n,r) network satisfying the condition on m, then there is some $x \in \{1,2, \ldots, \min\{n-1,r\}\}$. Given a connection request $I_i$, $i \in \{1,2, \ldots, nr=N\}$, with $|I_i|=r' \leq r$, a set of any $m'=(n-1)r'^{1/x}+1$ available middle switches is taken; without loss of generality, let the destination sets of these middle switches be $M_1, M_2, \ldots, M_{m'}$. The following algorithm will generate a set of middles switches through which the connection request can be satisfied.

Algorithm:

```
Step 1: mid_switch ← φ;
    for j=1 to m' do
        S_j ← M_j ∩ I_i;
    repeat
        find S_k (1 ≤ k ≤ m') such that
        |S_k| = min{|S_1|, |S_2|, ..., |S_m'|};
        min_set ← S_k;
        mid_switch ← mid_switch ∪ {k};
        if min_set ≠ φ then
            for j = 1 to m' do
                S_j ← S_j ∩ min_set;
    until min_set = φ;
```

Step 3: connect $I_i$ through the middle switches in mid_switch and update the destination sets of these middle switches.

It would be appropriate to provide some explanations of the steps in the above algorithm before its complexity is discussed. In the algorithm, mid_switch designates a set of middle switches 14m which initially is empty, but will contain at the end of the algorithm at most x middle switches 14m the intersection of whose destination sets is empty. The sets $S_1, S_2, \ldots, S_{m'}$ are temporary holding sets which store the results of the intersection operations and min_set indicates the minimum cardinality set of the $S_1, S_2, \ldots S_{m'}$ at each iteration.

Step 1 takes the destination sets of the m' available middle switches and removes all elements other than those in $I_i$, since one clearly need only be concerned with connection paths to these output switches in an attempt to satisfy the connection request Ii. Step 2 repeatedly finds the minimum cardinality. set among $S_1, \ldots, S_{m'}$, and intersects each $S_j$ ($1 \leq j \leq m'$) with this minimum cardinality set until min_set becomes empty. At this point, mid_switch contains a set of middle switches 14m the intersection of whose destination sets is empty. These middle switches 14m are used in Step 3 to satisfy the connection request. The destination sets are also updated in Step 3.

To show that at most x middle switches 14m are selected at the end of the algorithm and to analyze the complexity of the algorithm, it can be assumed that $m'=(n-1)w$ for some $w > r'^{1/x} < 1$. Since before Step 2 is executed in the first iteration, there are a total of at most $(n-1)r'$ elements distributed among $S_1, S_2, \ldots, S_{m'}$, it follows that after Step 2 is executed in the first iteration, min_set=$S_k$ and $|S_k| \leq r'/w$, where $|S_k|=\min\{|S_1|,|S_2|,\ldots,|S_{m'}|\}$. Similarly, after Step 2 of the second iteration, |min_set|$\leq r'/w^2$. This reduction of the cardinality of min_set will continue from one iteration to the next, each time the value of |min_set| being reduced to at most 1/w times its value at the end of the previous iteration. There can be at most $1+\log_w r'$ iterations. Note that when $\log_w r' = \log r'/\log w < \log r'/\log r'^{1/x} = x$, then the result is $1+\log_w r' \leq x$, that is, at most x middle switches 14m are selected. It should also be noted that all sets here are subsets of $\{1,2, \ldots, r\}$, then they can be represented with a "bit-vector" data structure. Thus, the time of Step 1 is proportional to m'r' and the time of each iteration of Step 2 is proportional to m'|min_set|. This means that the total time of the algorithm is proportional to $$m'(r' + r'/w + r'/w^2 + \ldots + r'/w^{\log w} r') =$$

$$m'r'(1 + 1/w + 1/w^2 + \ldots + 1/w^{\log w} r') \leq 2m'r'.$$

Therefore, the complexity of the algorithm is $O(m'r')$. Taking $x=\log r$, the result is that the complexity is $O(nr)$ or $O(N)$ for arranging one input port broadcast connection request.

It is interesting to note that with this algorithm if a network is provided through which no connections have been made, and if one proceeds to provide connection paths in response to requests from input ports until each output port has been connected to some input port, then the total time will be $O(nN)$. To see this, note that the handling of at most nr input ports requests $I_i$, $1 \leq i \leq nr$. The time to satisfy each input port request is at most $cn|I_i|$ for some constant c. Thus, the total time to satisfy all the input port requests is $$\sum_{i=1}^{nr} cn|I_i| = cn \sum_{i=1}^{nr} |I_i| \leq cn \times nr = cn^2 r$$

This shows that the complexity of the algorithm for satisfying an entire broadcast assignment is $O(nN)$.

Alternatively, as shown in FIG. 4, the components to implement the network control algorithm in hardware for a $v(m,n,r)$ broadcast network are:

Middle switch state registers (M) 70: For each middle switch 14m, there is an r-bit register to store the state of the middle switches 14m (the destination set of the middle switch 14m) that is, for any i, $0 \leq i \leq r-1$ an 1 at the ith bit of that register denotes the ith output link in that middle switch 14m is occupied. M registers are needed in total.

Shift registers (S) /counters (C) 72: Shift registers and counters are used to obtain the cardinality of the destination set of a middle switch 14m, that is, to count the number of 1's in a middle switch state register. The number of shift registers and counters can vary from 1 to m, depending on whether these middle switch state registers are counted sequentially or parallely.

Figure 5A:
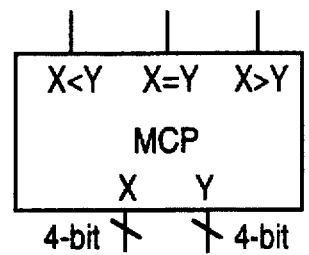
FIGS. 5a and 5b are block diagrams of a magnitude comparator and a circuit of a magnitude comparator, respectively.
Figure 5B:
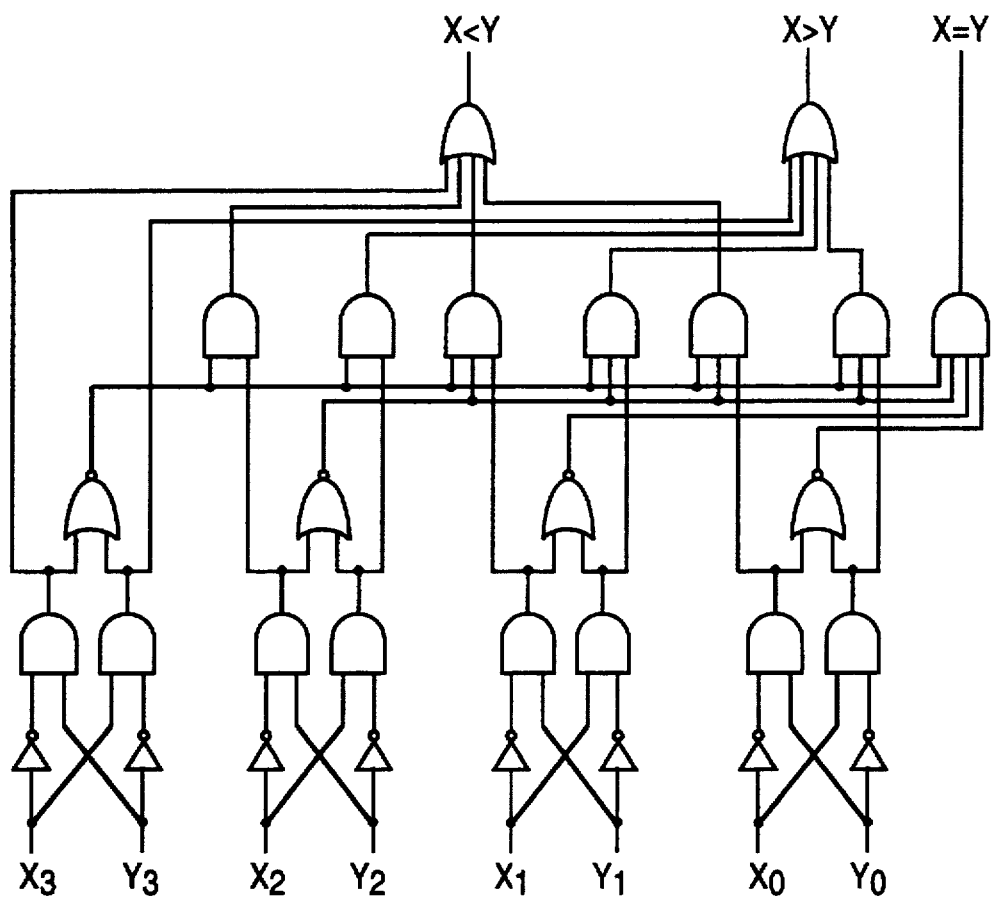
Figure 6A:
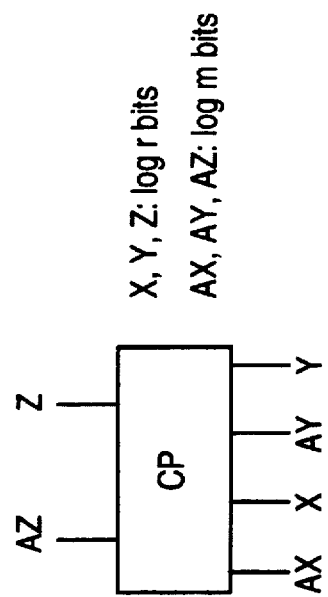
FIGS. 6a and 6b are block diagrams of the comparator cell and the circuit of a comparator cell, respectively.
Figure 6B:
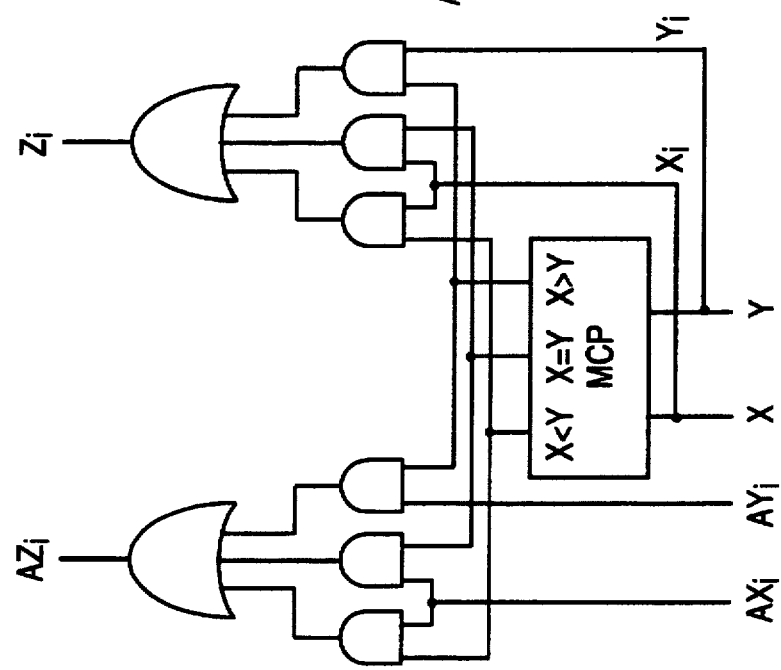

Comparator array 74: A comparator array 74 is used to determine the middle switch 14m with the minimum cardinality destination set. In the comparator array, besides the smaller comparand, the middle switch register address of this comparand is also passed to the next stage comparator. FIG. 5 shows a 4-bit magnitude comparator, and FIG. 6 shows the structure and circuit of a comparator cell used in the comparator array. Again, the number of comparator cells in the array can vary from 1 to m−1, depending on how the comparisons are performed.

Masking register (MASK) 78: An r-bit register is used to enable or disable the bit slices to be involved in the counting and comparing operations across all middle switch state registers. Masking register actually accomplishes the bitwise intersection operations.

Minimum register (MIN) 80: It stores the content of current minimum cardinality middle switch state register whose address is generated by the comparator array.

Selected registers (SEL) 76: It stores all middle switch addresses selected for making the new connection request.

Timing control 82: Timing control unit is used to supervise the operations in shift registers, counters, comparators as well as load all registers.

As was mentioned above, while considering the hardware implementation of the network control algorithm, there exists a trade-off between the hardware cost and the setting-up time provided by the controller. In the following, two typical cases are disclosed, where the counting operations on the number of 1's in the middle switch state registers are serial or parallel, to explain the basic ideas of the design. Based on these ideas, other compromise designs, even with some improvements, are easy to implement.

To begin with, consider a simple hardware implementation which directly simulates the software implementation of the control algorithm. That is, it does all the operations sequentially. This design requires the minimum hardware cost among other designs. For each operation in the algorithm, only one hardware unit is needed to perform it. Even with so little hardware, tremendous timesaving in hardware/software ratio can still be achieved. For example, for an operation requiring $O(1)$ time (which may require several statements or instructions) in software implementation, only $O(1)$ clocks are needed in hardware implementation.

Figure 7:
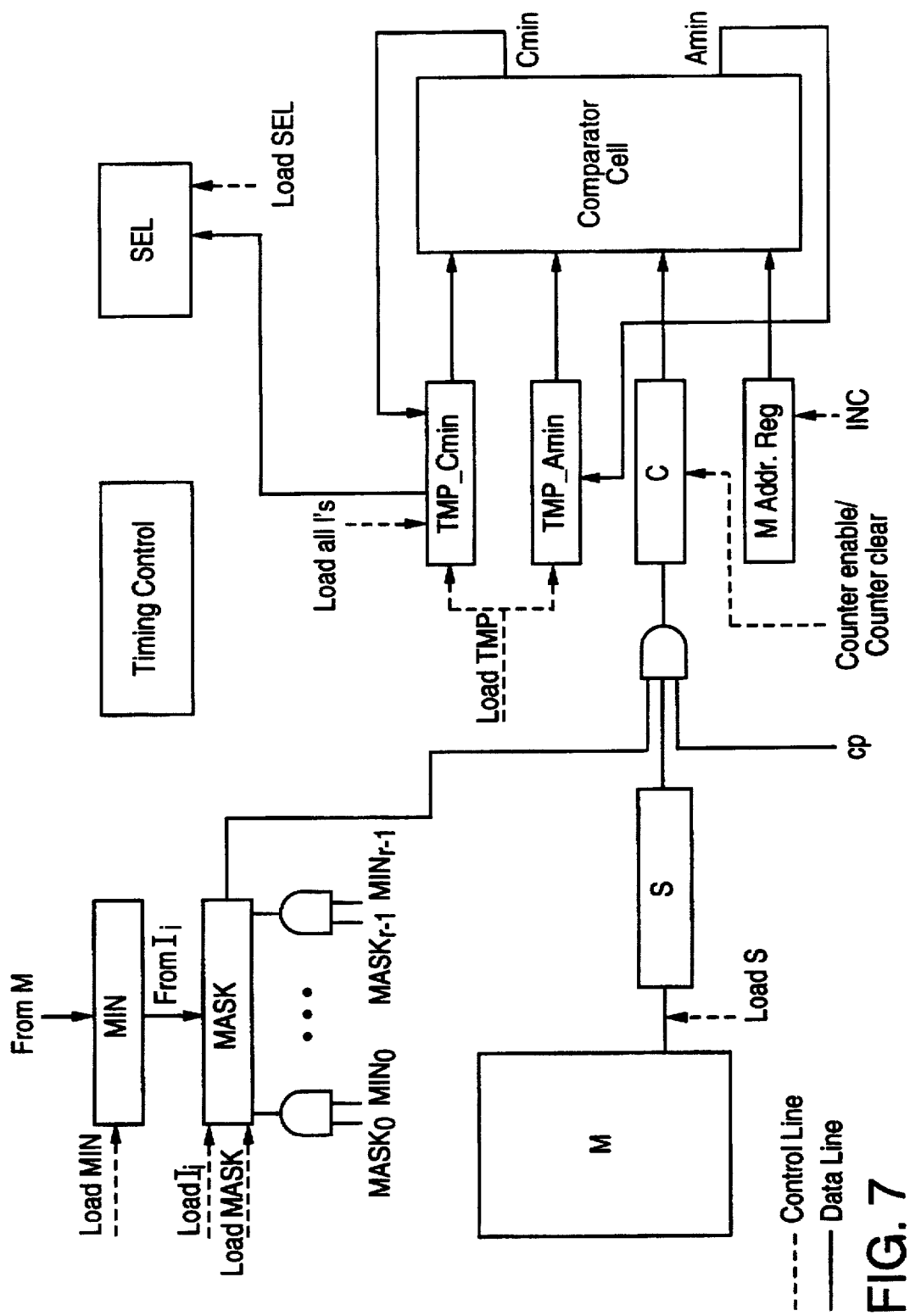
FIG. 7 is a representation of a sequential implementation of the controller.
Figure 8:
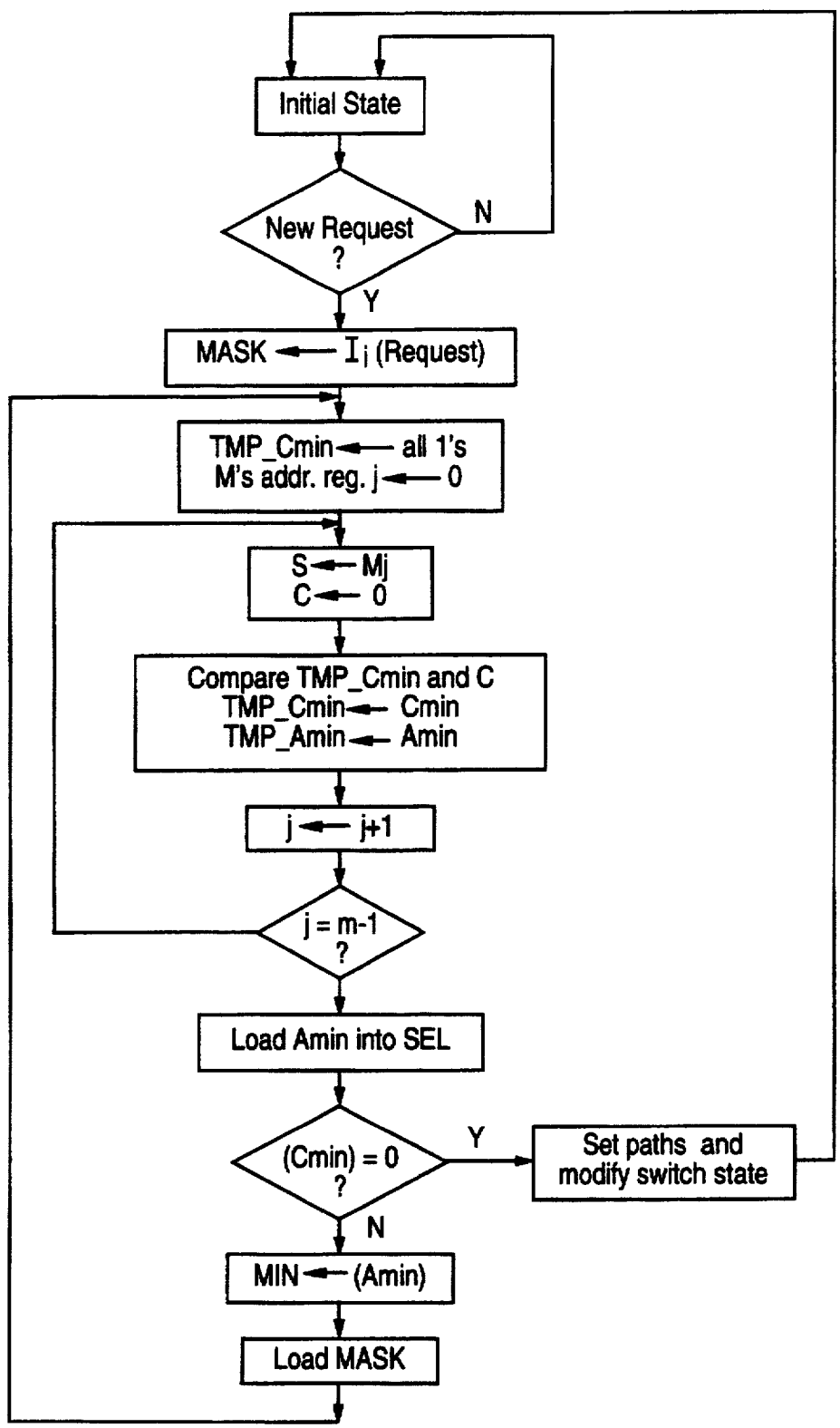
FIG. 8 is a control flow chart of the sequential implementation.

FIG. 7 shows the implementation details. Here, a shift register (S), a counter (C), a comparator cell and two temporary registers (TMP_Cmin and TMP_Amin) are used to do the counting/comparing. FIG. 6 gives the flow chart of the controller. When no connection request is pending, the system is in the initial state, waiting for a new connection request. When a request $I_j$ comes, the controller initializes the masking register with $I_j$, TMP_Cmin with all 1's, and sets middle switch address register to 0. Then it loads a middle switch register to shift register and clears the counter to 0. Now the controller enables the shifting-counting process under the control of current masking register and performs it r times. Note that masking register and shift register here are cyclic shift registers. After r times shifting, the contents of these registers return to their original values before the operation. Once the counting is done, the controller compares the content of the counter with that of the current minimum cardinality middle switch stored in TMP_Cmin through the comparator, and then puts the smaller comparand into TMP_Cmin and its address into TMP_Amin. This completes the operations on one middle switch 14m. The controller repeats the above process to all middle switches 14m one by one. After all are done,the number of 1's and the address of the minimum cardinality middle switch 14m are in TMP_Cmin and TMP_Amin. The controller puts them into selected registers for making connections, then checks whether the minimum cardinality middle switch has zero number of 1's. If the number of 1's is zero, then the search process is over and the controller turns to set up the connection paths and modify the switch states based on the contents in the selected registers. If it is not zero, the controller loads the state of the current minimum cardinality middle switch into the minimum register, then loads masking registers and clears the counters to begin another search cycle.

At each search cycle, r clocks are needed for each of m middle switches and the time spent in other operations is ignorable. Thus total is nnr clocks. At most x search cycles are needed since $x \leq 2\log r/\log\log r$. Therefore, the whole process for finding middle switches for a connection request is $O(mr\log r/\log\log r)$ clocks.

An improvement can be achieved if whenever the content of the counter is greater than the content of TMP_Cmin, which can be indicated by the output of the comparator, the controller ends the current counting and goes to the next middle switch state register. In this case, it is necessary to recover the original content of masking register each time.

It should be noted that based on the structure of the nonblocking broadcast networks, besides the components mentioned above, input switch state registers are also needed to store the input switch states. The input switch state register where the current connection request arises also participates the above process in the way that it enables only those middle switches which are available to this particular input switch to participate the search process. Also, only $(n-1)r^{1/x}+1$ middle switches can be allowed from all available middle switches to participate the above search process to further reduce the time.

While considering the hardware implementation of the algorithm, there is no restriction to the sequential flow control as in the software implementation. Multiple units can e used for each operation and it can be done parallely to take full advantage of cheap hardware cost. The parallel implementation of the control algorithm, the counting of the number of 1's in the middle switch state registers and the cardinality comparisons both are done in parallel. For simplicity of the description, it is assumed that $m=2^k$ for $k \geq 0$. For other values of m, the design principles still apply.

Figure 9:
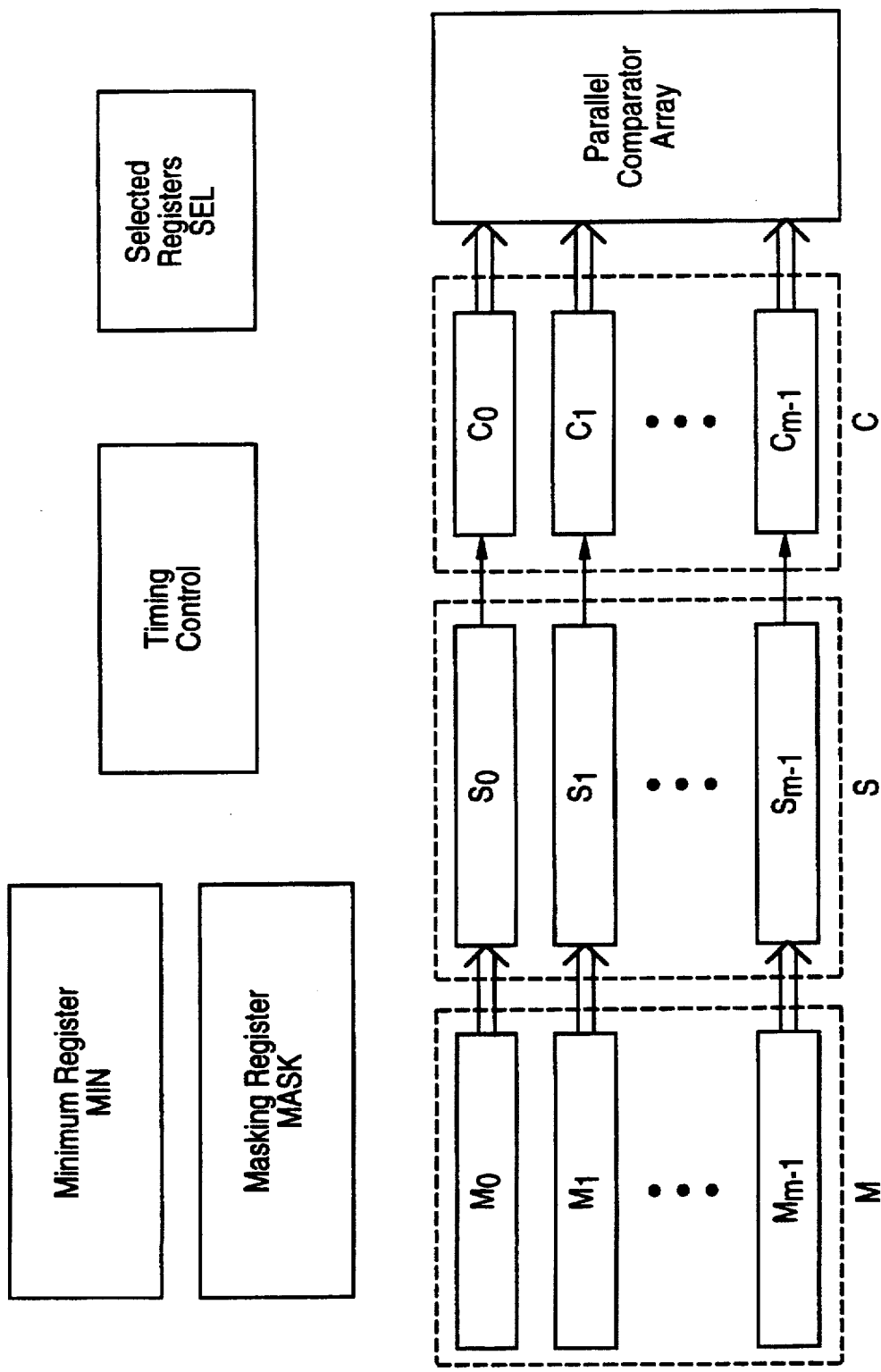
FIG. 9 is a block diagram of a parallel implementation.
Figure 10A:
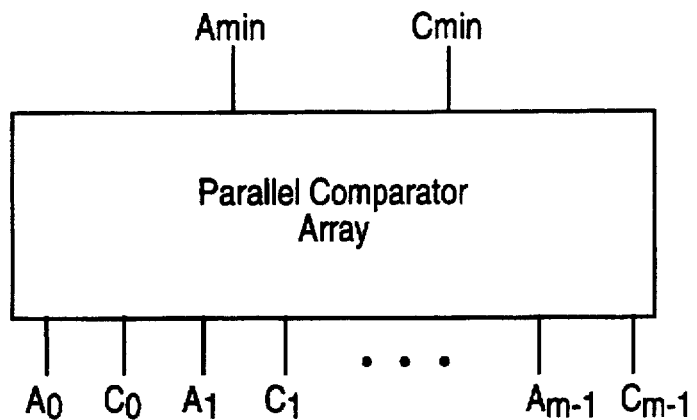
FIGS. 10a and 10b are block diagrams of a parallel comparator array and a tree configuration of the parallel comparator array, respectively.
Figure 10B:
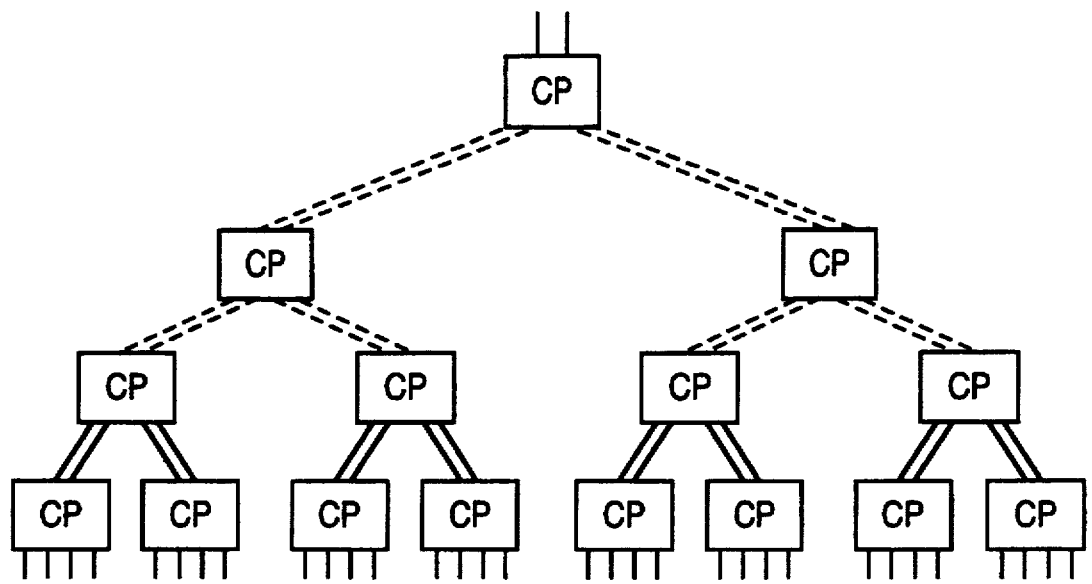
Figure 11:
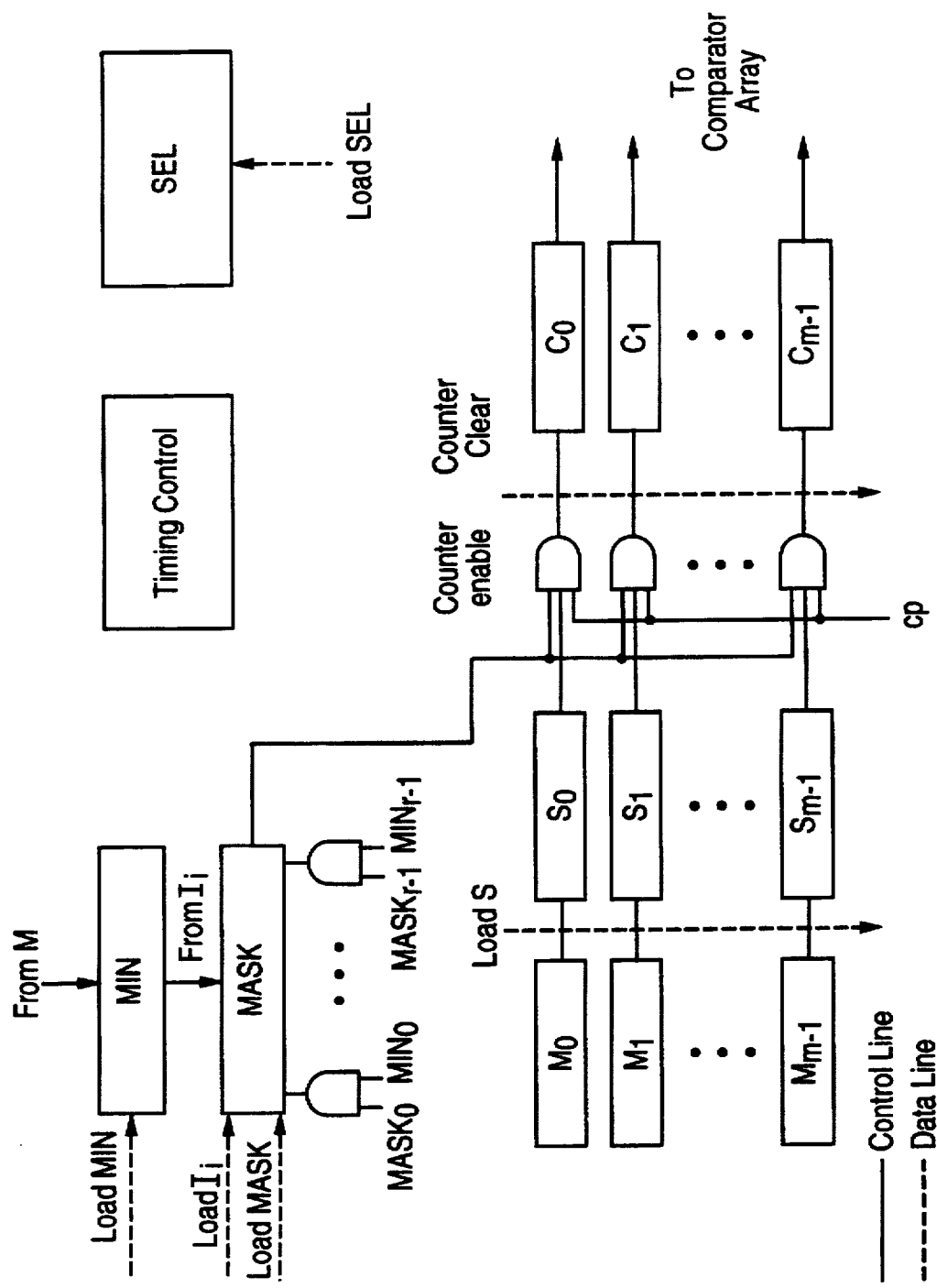
FIG. 11 is a block diagram of detailed connections among registers and counters.

First consider the implementation where counting the number of 1's in the middle switch state registers is accomplished by counters. M shift register/counter pairs are used, each of them for a middle switch state register, and m-1 comparator cells arranged in a complete binary tree configuration. FIG. 9 is the overview of this parallel implementation. FIG. 10 shows the external and internal structure of the parallel comparator array. FIG. 11 shows the detailed connections among all registers and counters.

Figure 12:
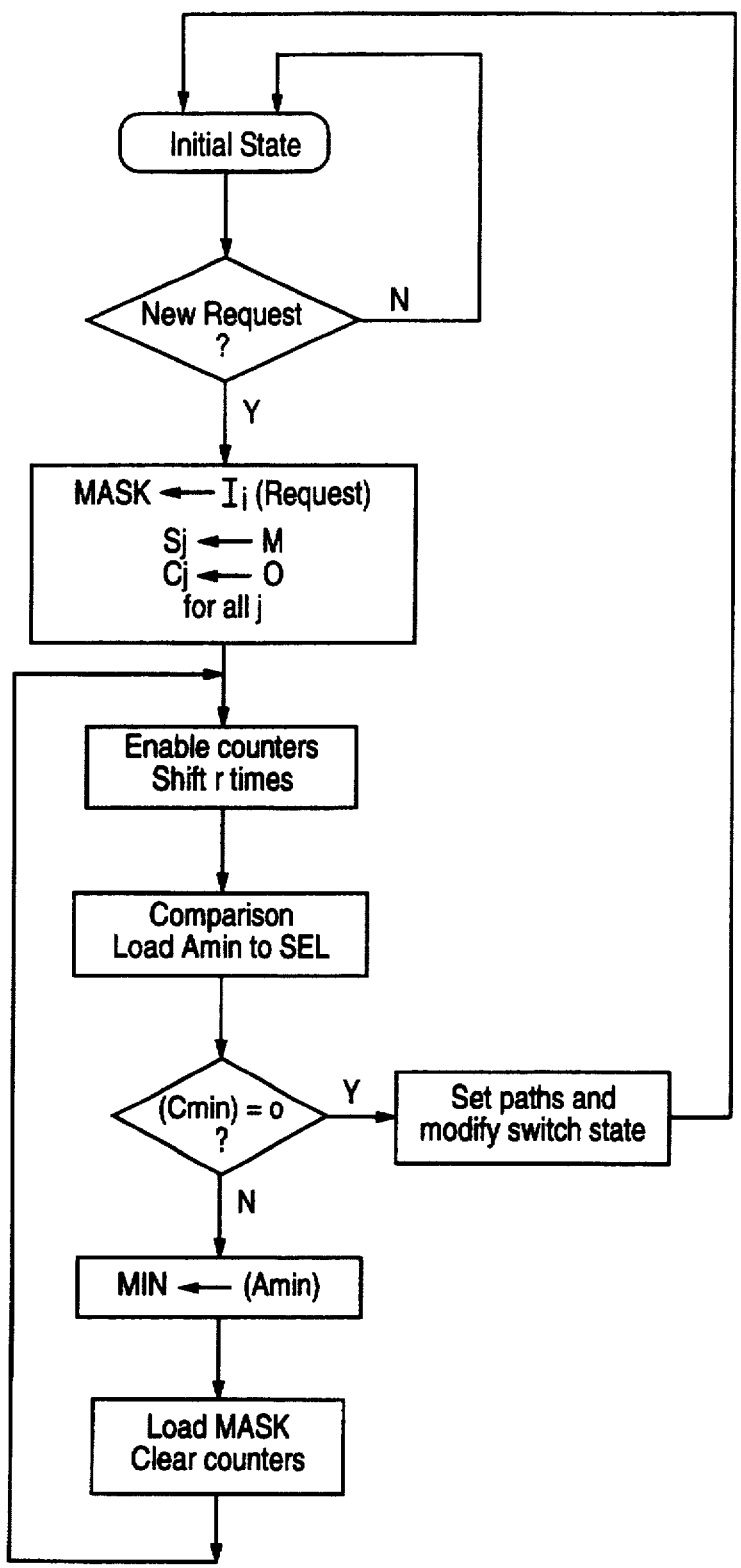
FIG. 12 is a control flow chart of a parallel implementation.

The control flow chart of the controller is given in FIG. 12. When no connection request is pending, the system is in the initial state, waiting for a connection request. When a request $I_i$ is coming, the masking register initially is assigned $I_i$, all shift registers are assigned the contents of corresponding middle switch state registers, and all counters are cleared to 0. Then, the controller enters a search cycle to search the minimum cardinality middle switch under the control of current masking register and enables the parallel shifting-counting operation, which is performed r times. When counting is done, the number of 1's and the address of the minimum cardinality middle switch appears at the top of the parallel comparator array. The controller puts the address of this middle switch into the selected registers for realizing the connection request, then checks whether the content of the counter at the top of the parallel comparator array is zero. If it is zero, then the search process is over and the controller turns to set up the connection paths and modify the switch states based on the contents in the selected registers. If the content of the counter is not zero, the controller loads the state of the current minimum cardinality middle switch into the minimum register, then loads masking registers and clears the counters to being another search cycle.

At each search cycle, r clocks are needed to do the shifting-counting operation and the time spent in other operations is ignorable. Totally, at most x search cycles are needed. Therefore, the whole process for finding middle switches for a connection request is $O(r \log r/\log \log r)$ clocks.

In the previous implementations of the control algorithm, a shift register/counter pair was used to count the number of 1's in a middle switch state register. A faster way to implement this function is using a combinational circuit since this function itself does not require any timing control. For example, adders can be used to do the counting.

FIG. 13 shows a half-adder (HA) array which implements the counting. There are r rows of half-adders in the array and the number of half-adders at each row is at most log r with 1 at the bottom row and log r at the top row since the number of 1's in a middle switch state register can be at most r. Each row accomplishes the add-one operation. It is easy to see that a half-adder array consists of fewer than r log r half-adders. We a half-adder array can be used to replace a shift register/counter pair in previous two implementations. Thus, the time of counting 1's in a middle switch can be reduced to r gate propagations, compared to r clocks in previous implementations. In general, the former is much smaller. Therefore, in the sequential implementation, there are total time $O(mr \log r/\log \log r)$ gate propagations for the control algorithm, and in the parallel implementation, the total time is $O(r \log r/\log \log r)$ gate propagations.

Figure 14B:
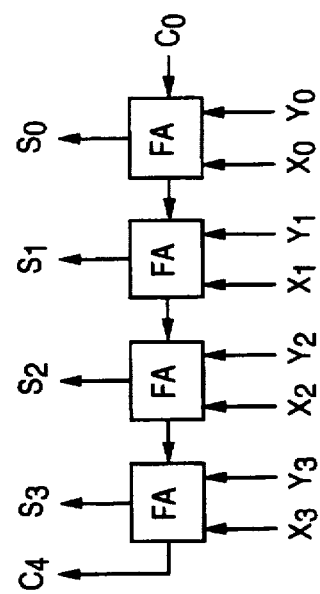
FIGS. 14a, 14b and 14c are block diagrams and circuits of a full-adder, a 4-bit parallel adder and a full-adder array, respectively.
Figure 14A:
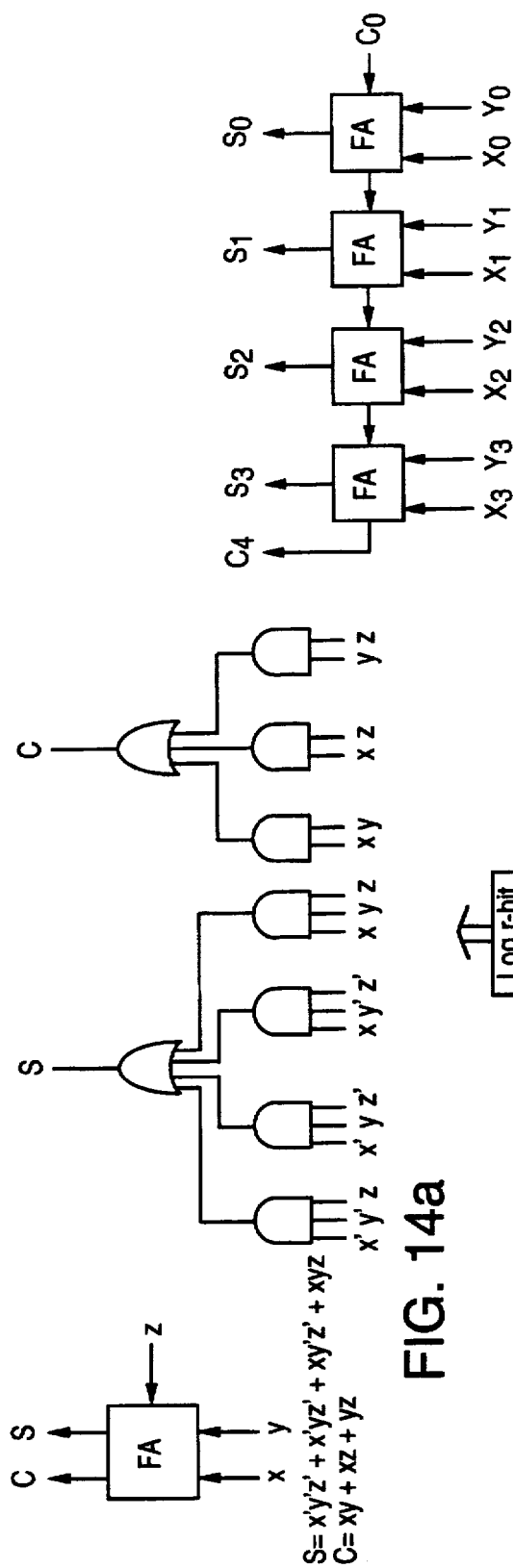
Figure 14C:
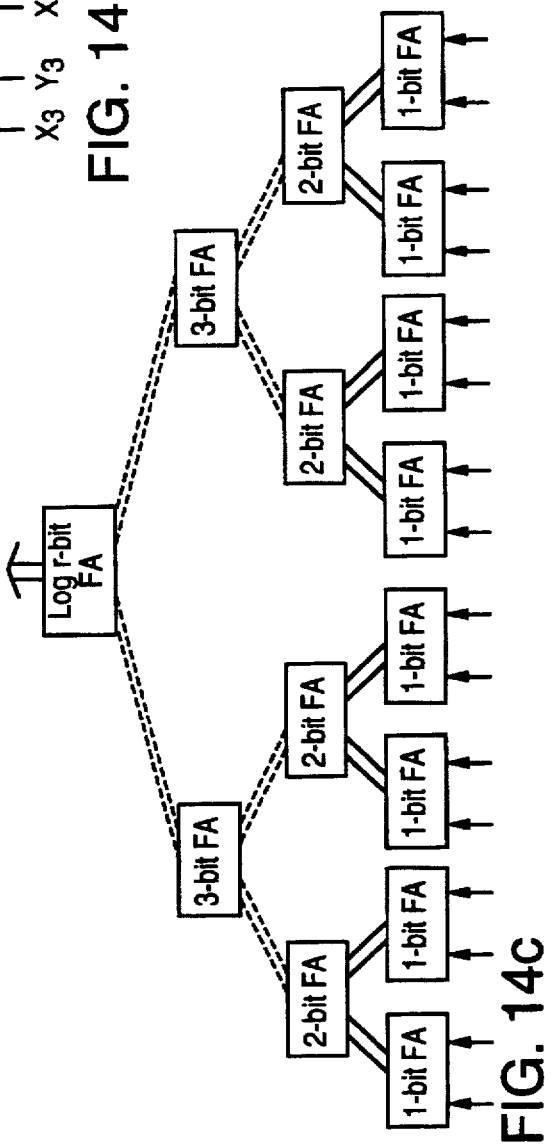

Instead of adding one each time, the additions can be done in parallel to further reduce the time spent on counting. To do so, full-adders are needed (FA). FIG. 14 shows a tree configuration of full-adders for counting 1's in a middle switch state register. Note that since there is no carry to the least significant bit of each k-bit full-adder ($1 \leq k \leq \log r$), the last bit full-adder can be replaced by a half-adder in FIG. 14.

The total number of adders used in this tree configuration is O(r)FA/HA's. Note that the gate propagation in this structure is only $O(\log r)$. Thus, if a tree configuration is used to replace the shift register/counter pair in the parallel implementation, the total time for the control algorithm is $O(\log r \log r/\log \log r)$ gate propagations.

TABLE 1

Summary of various designs of the network controller

| Design | Gate | Clock | Gate Delay |
|---|---|---|---|
| Sequential/Counter | O (log r) | O (nr log r/ loglog r) | — |
| Sequential/Adder | O (r) | O (m log r/ loglog r) | — |
| Parallel/Counters | O (m log r) | O (r log r/ loglog r) | — |
| Parallel/Adders | O (mr) | O (log r/ loglog r) | O (log r log r/ loglog r) |

Figure 15:
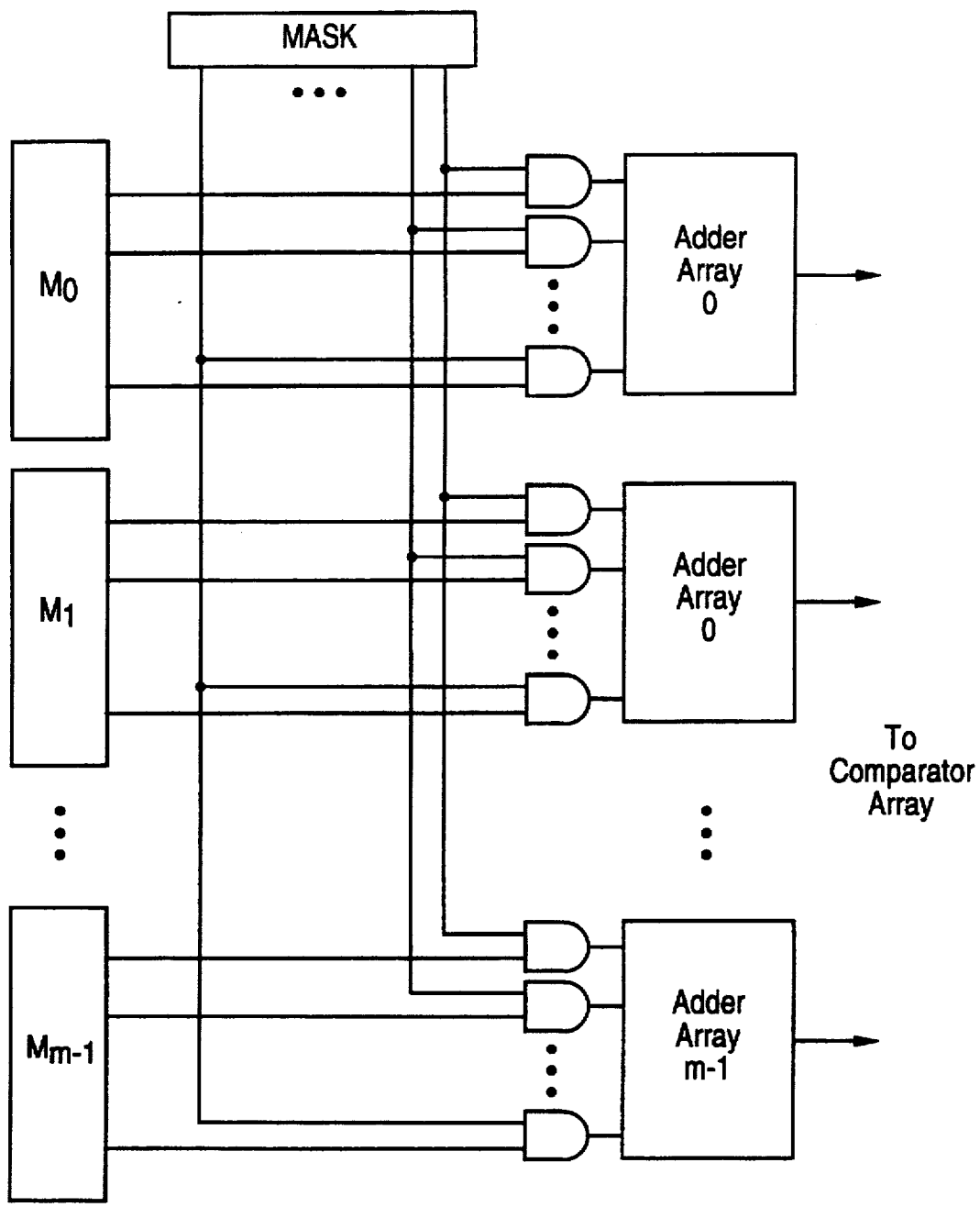
FIG. 15 is a representation of detailed connections when using an adder array.

Of course, when an adder array is used to replace a shift register/counter pair, there are some changes in the connection details. FIG. 15 shows the detailed connections among the middle switch registers, masking register and the adder arrays.

In Table 1, the various designs are summarized in terms of number of gates and the delays. Note that a single r×r middle switch consists of r 1-to-r demultiplexers and has $O(r^2)$ gates while even in the most expensive design—Parallel/Adders, controller has only O(r) gates for each middle switch.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed:

1. A controller for a nonblocking broadcast switching network having $N_2$ or $r_1$ input stage switches with $N_1$ or $n_1 r_1$ input ports and where each input switch has $n_1$ input ports and $N_1 = n_1 r_1$ where $r_1 \geq 1$ and $n_1 \geq 1$ and are integers, $r_2$ output stage switches with $n_2 r_2$ output ports where each output switch having $n_2$ output ports and $N_2 = n_2 r_2$ where $r_2 \geq 1$ and $n_2 \geq 1$ and are integers and m middle stage switches where m is an integer and each middle switch has at least one link connected to each input switch and at least one link connected to each output switch, where $$m > \min_{1 \leq x \leq \min\{n_2-1, r_2\}} \{(n_1-1)x + (n_2-1)r_2^{1/x}[+1]\}$$

and where $\min\{n_2-1, r_2\}$ equals the smallest of either $n_2-1$ or $r_2$, and $\min\{(n_1-1)x+(n_2-1)r_2^{1/x}\}$ is the smallest integer solution of $\{(n_1-1)x+(n_2-1)r_2^{1/x}\}$ said middle stage of m switches having I inputs where $I \geq r_1$ and is an integer, and J outputs, where $J \geq r_2$ and is an integer, x or fewer of the m switches, where $1 \geq x \geq \min\{n_2-1, r_2\}$ and is an integer, always available to form a connection between an idle input port and a plurality of idle output ports, but no output port is connected to more than 1 input port and the m middle stage switches in communication with the input and output stage switches comprising:

means for determining which middle stage switches of the m middle stage switches where $$m > \min_{1 \leq x \leq \min\{n_2-1, r_2\}} \{(n_1-1)x + (n_2-1)r_2^{1/x}[+1]\}$$

have an idle link to the input switch where a broadcast connection request arises and idle links to the output switches in the broadcast connection at a given time in the network; and means for choosing middle stage switches from only the middle switches which have an idle link to the input switch where the broadcast connection request arises and idle links to the output switches in the broadcast connection to form the desired broadcast connection between an idle input port and a plurality of idle output ports without any rearrangement of existing connections between an idle input port and a plurality of idle output ports.

2. A controller as described in claim 1 wherein the choosing means chooses the minimum number of middle switches to form the desired broadcast connection.

3. A controller as described in claim 2 wherein there are always enough middle stage switches in the network to form the desired broadcast connection.

4. A controller as described in claim 3 wherein the determining means includes middle switch state registers which store information about a state of middle switch output links.

5. A controller as described in claim 4 wherein the choosing means includes means for picking the middle switches which form the desired broadcast connection.

6. A controller as described in claim 5 wherein the choosing means includes a sequential circuit or a combinational circuit which determines the number of 1's in a middle switch state register.

7. A controller as described in claim 6 wherein the choosing means includes a sequential or combinational circuit which takes a group of binary numbers and their addresses as input and outputs the minimum binary number and its address.

8. A controller as described in claim 7 wherein the picking means includes shift registers/counters or adder arrays which identify for each considered middle stage switch the number of output switches with which it connects, said shift register/counter or adder arrays connected to the middle switch stage registers; a comparator array connected to the shift registers/counters or adder arrays which choose the middle stage switch which connects to the minimum number of output switches.

9. A controller as described in claim 8 wherein the choosing means includes a masking register connected to the shift registers/counters or adder arrays which only provides information about middle stage switches that are connected to desired output switches.

10. A controller as described in claim 9 wherein the choosing means includes a minimum register connected to the masking register and the middle switch state registers for providing the state of the middle switch which is chosen by the comparator array.

11. A controller as described in claim 10 wherein the choosing means includes x selected registers to store the middle switches chosen to form a broadcast connection.

12. A controller as described in claim 11 wherein the choosing means includes a timing control connected to all the registers and arrays for controlling the sequence of their operation.

13. A controller for a nonblocking broadcast switching network having input stage switches with input ports, output stage switches with output ports and middle stage switches in communication with the input and output stage switches comprising:

a mechanism for determining which middle stage switches have an idle link to the input switch where a broadcast connection request arises and idle links to the output switches in the broadcast connection at a given time in the network; and a mechanism for choosing middle stage switches from only the middle switches which have an idle link to the input switch where the broadcast connection request arises and idle links to the output switches in the broadcast connection to form the desired broadcast connection between an idle input port and a plurality of idle output ports without any rearrangement of existing connections between an idle input port and a plurality of idle output ports without re arrangement of any existing connections.

* * * * *

UNITED STATES PATENT AND TRADEMARK OFFICE
CERTIFICATE OF CORRECTION

PATENT NO.  : 5,801,641
DATED       : September 1, 1998
INVENTOR(S) : Yuanyuan Yang and Gerald M. Masson It is certified that error appears in the above-identified patent and that said Letters Patent is hereby corrected as shown below:

Column 10, line 46, after "cardinality" delete the period (.).

Claim 1, Column 15, line 24, in the formula, change the two plus symbols (+) to minus symbols (-).

Signed and Sealed this

Nineteenth Day of October, 1999

*Attest:*

Q. TODD DICKINSON

*Attesting Officer*    Acting Commissioner of Patents and Trademarks